May 24, 1938.  W. K. LINE  2,118,733

VEHICLE BRAKE

Filed Feb. 24, 1937   2 Sheets-Sheet 1

Inventor

W. K. Line

By Clarence A. O'Brien
Hyman Berman

Attorneys

May 24, 1938.  W. K. LINE  2,118,733
VEHICLE BRAKE
Filed Feb. 24, 1937  2 Sheets-Sheet 2
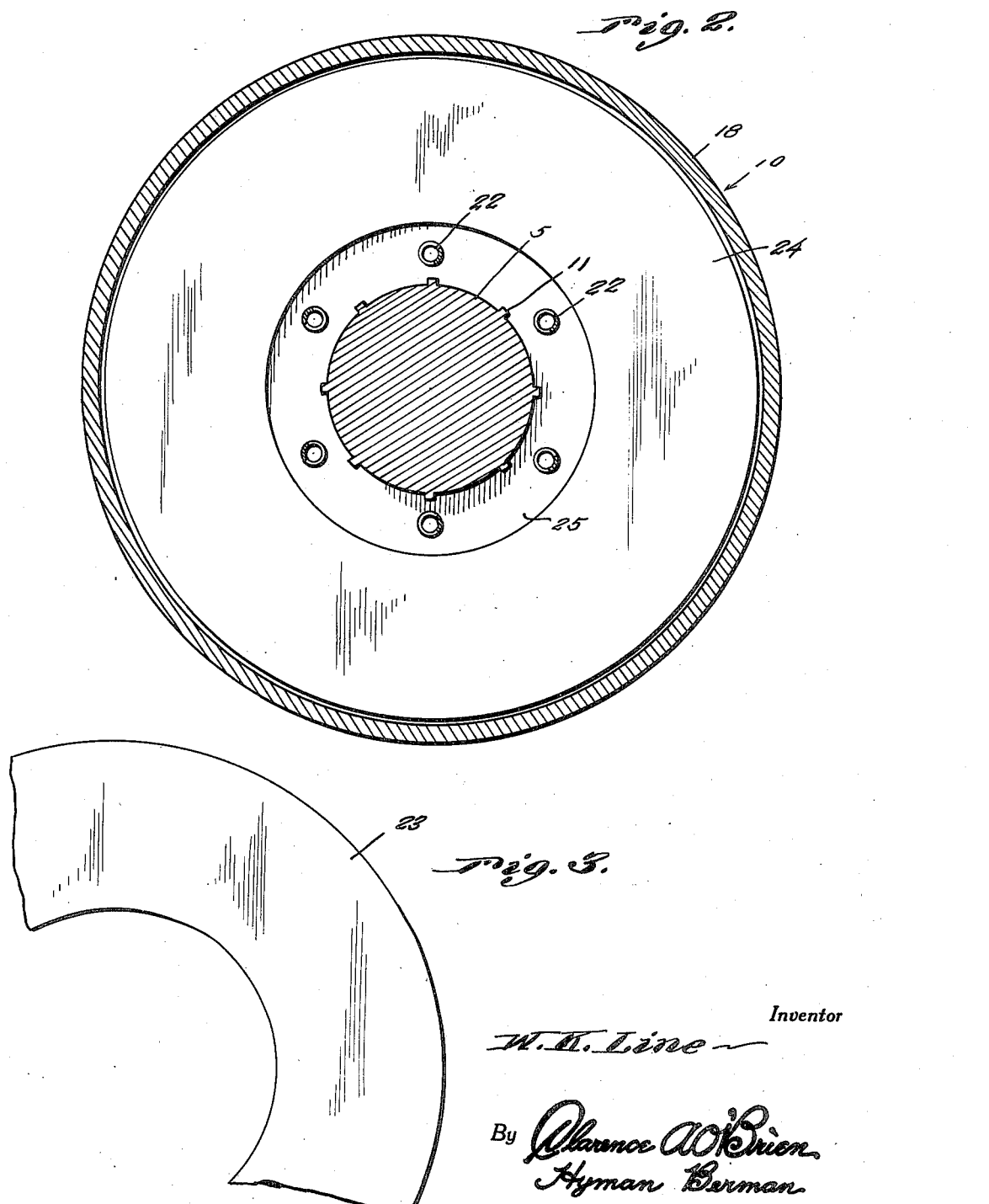

Patented May 24, 1938

2,118,733

UNITED STATES PATENT OFFICE 2,118,733

VEHICLE BRAKE

William K. Line, Butte, Mont.

Application February 24, 1937, Serial No. 127,498

5 Claims. (Cl. 188—72)

This invention relates to an improved vehicle brake of a mechanical friction type characterized by a spring released, slidably mounted annulus or collar cooperable with a brake lining confined within the limits of a brake drum in such a manner as to obtain the desired results.

My primary aim is to generally improve upon brake constructions of this general type by providing an ingenious structural rearrangement and organization of features characterized by requisite simplicity and efficiency, and well balanced and otherwise designed to render it highly and aptly fitted for the purposes intended.

In carefully reducing to practice the principles of the inventive conception, I have found it expedient and practicable to utilize a slidably splined annulus or collar, this fitting telescopically within the cup-like portion of the brake drum, being normally thrust in a direction away from the friction surface by coacting springs, being depressed against the springs by foot control means and being otherwise fashioned to insure the accomplishment of effective and reliable results.

Other features and advantages will become more readily apparent from the following description and drawings:

In the accompanying drawings, wherein like numerals are employed to designate like parts throughout the views:

Figure 3 is a fragmentary view of the brake band.

Figure 4 is an elevational view of the spring retention and abutment ring.

Figure 1:
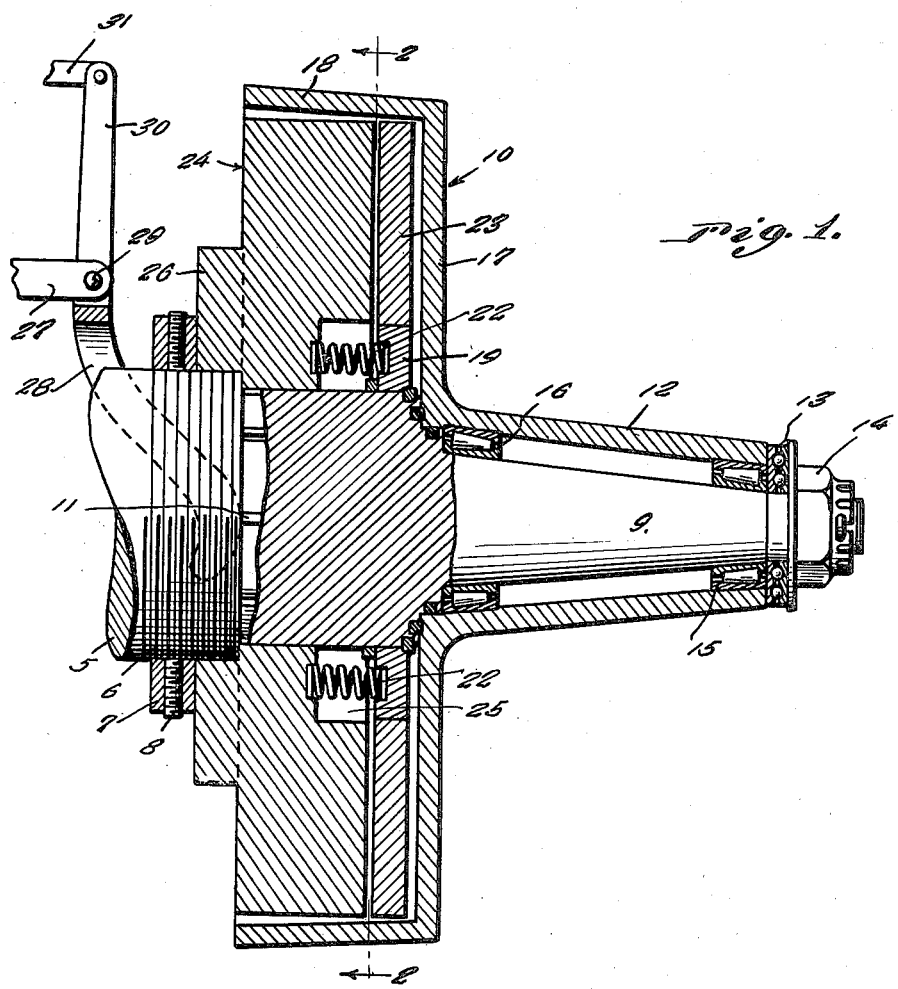
Figure 1 is a view partly in section and partly in elevation illustrating the complete axle and brake assembly constructed in accordance with the specific principles of the present invention.
Figure 2:
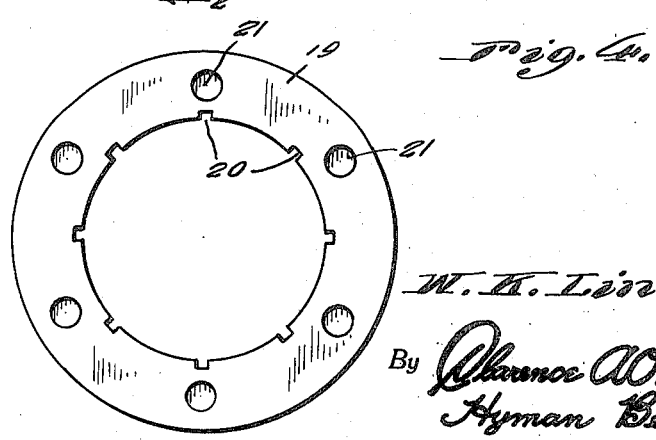
Figure 2 is a section which may be said to be taken approximately on the plane of the line 2—2 of Figure 1, looking in the direction of the arrows.

Referring now to the drawings by distinguishing reference numerals and primarily to Figure 1, it will be observed that the vehicle axle is denoted by the numeral 5. This is provided with a screw-threaded portion 6 to accommodate an adjusting and retention nut 7 held in place, that is, against displacement, by safety set screws 8. The free end portion 9 is tapered as is customary to provide the desired spindle to accommodate the wheel hub unit 10. That portion of the axle between the spindle and body is provided with a reduced shoulder portion having longitudinal circumferentially spaced ribs constituting keys or splines 11.

The hub unit 10 comprises a spindle housing 12 properly tapered and bearing at its outer end against a thrust bearing 13 held in place by a nut or equivalent means 14. The numerals 15 and 16 designate spaced bearing assemblies interposed between the spindle 9 and sleeve-like housing 12 providing for the desired free rotation for the wheel, (not shown). The disk-like braking surface is denoted by the numeral 17 and the circular flange is indicated at 18. On the interior of the brake drum portion and suitably fixed on the axle is a spring accommodation or adapter ring 19. This is in effect an abutment and is provided with keeper notches 20 engaging the splines or ribs 11. In addition, it is provided in its spring accommodation face with pockets or sockets 21 to accommodate the coiled spring 22. The floating brake band is denoted by the numeral 23 and this surrounds the adapter ring 19 and is adapted to be pressed against the braking or friction surface in order to provide the requisite braking action. This is accomplished by the collar-like brake shoe or unit 24. This is in the nature of an annulus of appropriate dimensions and the major portion thereof fits within the perimeter of the brake drum. At its center it is provided with a socket 25 to accommodate the springs 22. This socket telescopes over the adapter ring 19, when the shoe 24 is forced against the brake band 23 to provide the desired braking result. On the opposite side this brake shoe or spring returned follower unit 24 is provided with an outstanding circular projection 26 which bears against the adjusting washer 17.

The numeral 27 designates a suitable bracket on which the yoke 28 is pivotally mounted as at 29. The actuating lever 30 of the yoke is controlled by an operating rod or suitable means 31. Thus, by forcing the free cam-ends against the follower shoe 24, it is shoved into the brake drum against the tension of the springs 22 and into frictional contact with the brake band 23 to provide the desired braking action. It is evident, of course, that either mechanical, hydraulic, or other combination means may be employed to provide the sliding movement for the circular annulus or brake shoe 24.

In practice it is understood that the adjusting or stop washer 7 may be accurately set at the factory at the time of manufacture and rarely needs to be adjusted thereafter. When the brake band 23 wears too thin, all that is necessary is to remove the unit 10 and substitute a new brake band. In addition, it is obvious that by properly adjusting the thrust means 28, this insures the proper clearance between the one-piece brake shoe 24 and the brake band, and this simplifies and adds to the efficiency of operation of the complete assembly.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a brake construction of the class described, in combination, an axle including a body having a screw-threaded portion, a spindle portion and an intervening ribbed portion, a hub unit including a sleeve surrounding the spindle, and a cup-like brake drum surrounding the ribbed portion in concentric relation, an adapter ring keyed on said ribbed portion and opposed to the disk-like part of said brake drum, a ring-like brake band surrounding the adapter ring, and opposed in parallelism to the disk-like portion of the drum and confined within the perimeter of the drum, a spring pressed annular brake shoe slidably keyed on the ribbed portion of said axle and having its major portion confined within the brake drum and opposed to said adapter ring and brake band, and coiled springs interposed between the adapter ring and adjacent portion of the shoe.

2. In a brake construction of the class described, in combination, an axle including a body having a screw-threaded portion, a spindle portion and an intervening ribbed portion, a hub unit including a sleeve surrounding the spindle, and a cup-like brake drum surrounding the ribbed portion in concentric relation, an adapter ring keyed on said ribbed portion and opposed to the disk-like part of said brake drum, a ring-like brake band surrounding the adapter ring and opposed in parallelism to the disk-like portion of the drum and confined within the perimeter of the drum, an annular brake shoe slidably keyed on the ribbed portion of said axle and having its major portion confined within the brake drum and opposed to said adapter ring and brake band, coiled springs interposed between the adapter ring and adjacent portion of the brake shoe, together with a washer mounted on said threaded portion of the axle and in abutting contact with an adjacent face of said annular brake shoe.

3. As a component part of a brake construction of the class described, an adapter ring adapted to be fixedly splined on an axle, said ring being provided in one side with a plurality of sockets forming seats for reception of coiled springs, a ring-like brake band adapted to surround the marginal portion of said adapter ring, a collar-like brake shoe of annular design adapted to be slidably splined on an axle, said shoe being opposed to the adapter ring and brake band and of a diameter corresponding to the combined diameter of the adapter ring and brake band, the central portion of said brake shoe being socketed, coiled springs arranged in said sockets and having operating fit in the sockets in said adapter ring, and an adjusting and abutment washer adapted to be mounted on the axle and engageable with one face of said brake shoe in the manner and for the purposes described.

4. In a brake construction of the class described, in combination, an axle having a spindle at its outer end, an abutment washer adjustably mounted on the axle inwardly of the spindle, a one-piece annular brake shoe surrounding the axle between the abutment and spindle and slidable on said axle, said brake shoe being in engagement with said abutment washer, an adapter ring fixedly mounted on the axle between the brake shoe and spindle, springs interposed between the adapter ring and brake shoe, an annular brake band surrounding the adapter ring and opposed in parallelism to the adjacent face of the brake shoe, and a hub unit removably supported on said spindle and including a drum portion having its rim surrounding the peripheral outer edges of the brake band and brake shoe.

5. In a brake construction of the class described, in combination, an axle having a spindle, abutment means adjustably mounted on the axle at a point spaced inwardly of the spindle, an annular brake shoe surrounding said axle between the abutment means and spindle and slidable on said axle, said brake shoe being in contact with said abutment means, an adapter ring fixedly mounted on the axle between the brake shoe and said spindle, spring means interposed between the adapter ring and brake shoe, an annular brake band surrounding the adapter ring and opposed in parallelism to the adjacent face of said brake shoe, and a hub unit mounted on said spindle and including a drum portion having its rim surrounding the peripheral outer edges of the brake band and brake shoe respectively.

WILLIAM K. LINE.